US008236225B2

(12) United States Patent  (10) Patent No.:  US 8,236,225 B2
Song et al.  (45) Date of Patent:  Aug. 7, 2012

(54) DEVICE AND METHOD FOR FABRICATING FLAT DISPLAY DEVICE

(75) Inventors: Tae-Joon Song, Paju-si (KR); Seong-Pil Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/912,445

(22) Filed: Oct. 26, 2010

(65) Prior Publication Data

US 2011/0147989 A1  Jun. 23, 2011

(30) Foreign Application Priority Data

Dec. 23, 2009  (KR) .......................... 10-2009-0129801

(51) Int. Cl.
*B29C 59/00*  (2006.01)
(52) U.S. Cl. ...................................... 264/293; 425/385
(58) Field of Classification Search .................. 264/293, 264/319, 299, 334; 425/385, 436 R, 174.4, 425/441, 436 RM, 185, 186
See application file for complete search history.

(56) References Cited

U.S. PATENT DOCUMENTS

| 2003/0166814 A1* | 9/2003 | Sparrowe et al. ............. 526/319 |
| 2004/0219249 A1* | 11/2004 | Chung et al. ................. 425/385 |
| 2005/0116370 A1* | 6/2005 | Ogino et al. ................. 264/40.1 |
| 2007/0104813 A1* | 5/2007 | Wuister et al. ............. 425/174.4 |
| 2007/0105347 A1* | 5/2007 | Besinger ...................... 438/464 |
| 2007/0246441 A1* | 10/2007 | Kim et al. ...................... 216/41 |
| 2008/0090312 A1* | 4/2008 | Park et al. ...................... 438/14 |
| 2009/0026658 A1* | 1/2009 | Hosoda et al. ............... 264/319 |
| 2009/0108484 A1* | 4/2009 | Kruijt-Stegeman et al. . 264/40.5 |
| 2009/0283937 A1* | 11/2009 | Kodama et al. ............... 264/447 |
| 2010/0207301 A1* | 8/2010 | Suh et al. ...................... 264/447 |

* cited by examiner

*Primary Examiner* — Yogendra Gupta
*Assistant Examiner* — Ninh Le
(74) *Attorney, Agent, or Firm* — McKenna Long & Aldridge, LLP

(57) ABSTRACT

Disclosed are a device and method for fabricating a flat display device which can minimize an error of alignment of an imprinting mold and a substrate. The device for fabricating a flat display device includes a stage for seating a substrate; an imprinting mold bonded with the substrate to form a thin film pattern on the substrate, the imprinting mold comprises projections and grooves; and a mold holder for holding sides of the imprinting mold when the substrate and the imprinting mold are bonded with each other.

4 Claims, 6 Drawing Sheets

DEVICE AND METHOD FOR FABRICATING FLAT DISPLAY DEVICE

CROSS REFERENCE TO RELATED APPLICATION

This application claims the benefit of Korean Patent Application No. 10-2009-0129801, filed on Dec. 23, 2009, which is hereby incorporated by reference as if fully set forth herein.

BACKGROUND OF THE DISCLOSURE

1. Field of the Disclosure

The present invention relates to device and method for fabricating a flat display device which can minimize an error of alignment of an imprinting mold and a substrate.

2. Discussion of the Related Art

Recently, various kinds of flat display devices have been developed, which can reduce weight and volume that are disadvantages of a cathode ray tube. In the flat display devices, there are a liquid crystal display device, a field emission display device, a plasma display panel, an electroluminescence EL display device, and so on.

The flat display device is provided with a plurality of thin films formed by a mask process including a deposition step, an exposure step, a development step, an etching step, and so on. However, since the mask process has a complicate fabrication process, the mask process increases a production cost. Consequently, researches for forming the thin film by patterning using an imprinting mold are under progress.

The patterning is a process in which liquid resin is coated on the substrate, the imprinting mold having grooves and projections is brought into contact with a liquid polymer precursor to make inverted transcription of the grooves and the projections from the imprinting mold to the liquid polymer precursor, and the liquid polymer precursor made inverted transcription thus is cured by a curing step, to form a desired thin film pattern on the substrate.

In this instance, after a related art imprinting mold and a related art substrate are aligned with a fixed gap therebetween, a stage having the substrate seated thereon moves up to bond the substrate to the imprinting mold. However, since the alignment is made in a state the imprinting mold and the substrate has the fixed gap therebetween, at the time the stage having the substrate seated thereon moves up to bond the substrate to the imprinting mold, a mechanical error takes place.

SUMMARY OF THE DISCLOSURE

Accordingly, the present invention is directed to device and method for fabricating a flat display device.

An advantage of the present invention is to provide device and method for fabricating a flat display device which can minimize an error of alignment of an imprinting mold and a substrate.

Additional advantages, and features of the disclosure will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages and in accordance with the purpose of the invention, as embodied and broadly described herein, a device for fabricating a flat display device includes a stage for seating a substrate; an imprinting mold bonded with the substrate to form a thin film pattern on the substrate, the imprinting mold comprises projections and grooves; and a mold holder for holding sides of the imprinting mold when the substrate and the imprinting mold are bonded with each other.

The substrate is moved by the stage to align the substrate with the imprinting mold when the substrate and the imprinting mold are bonded with each other.

The mold holder has a wedge shaped surface for being brought into contact with the imprinting mold.

The mold holder is formed of Teflon.

In another aspect of the present invention, a method for fabricating a flat display device includes the steps of seating a substrate having a liquid polymer precursor on a stage; bonding an imprinting mold and the substrate with each other by moving the stage upward, for grooves and projections of the imprinting mold to press the liquid polymeric precursor; holding sides of the imprinting mold with a mold holder when the substrate and the imprinting mold are bonded with each other; and separating the substrate from the imprinting mold.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
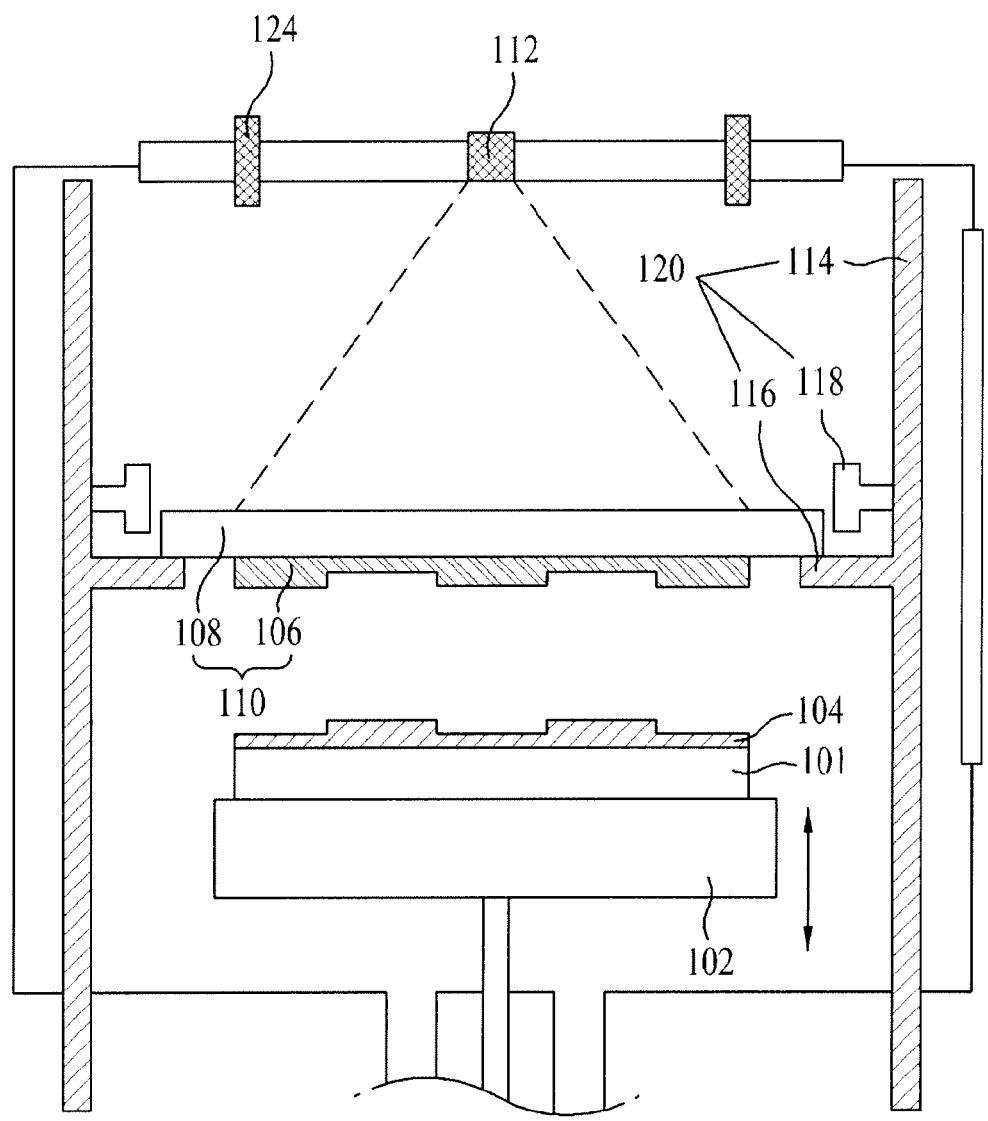
FIG. 1 illustrates a section of a device for fabricating a flat display device in accordance with a preferred embodiment of the present invention.

FIG. 1 illustrates a section of an imprinting device for fabricating a flat display device in accordance with a preferred embodiment of the present invention.

Referring to FIG. 1, the imprinting device includes a substrate 101, an imprinting mold 110, a light source unit 112, a vision unit 124, and an imprinting mold supporting unit 120.

The substrate 101 is adsorbed by, and seated on a stage 102. The substrate 101 has a thin film pattern 104 of a liquid polymer precursor patterned as the liquid polymer precursor is pressed down by/brought into contact with the imprinting mold 110. The thin film pattern 104 has a form in which grooves and projections of the imprinting mold 110 are inverted and transcribed, respectively.

Figure 3A:
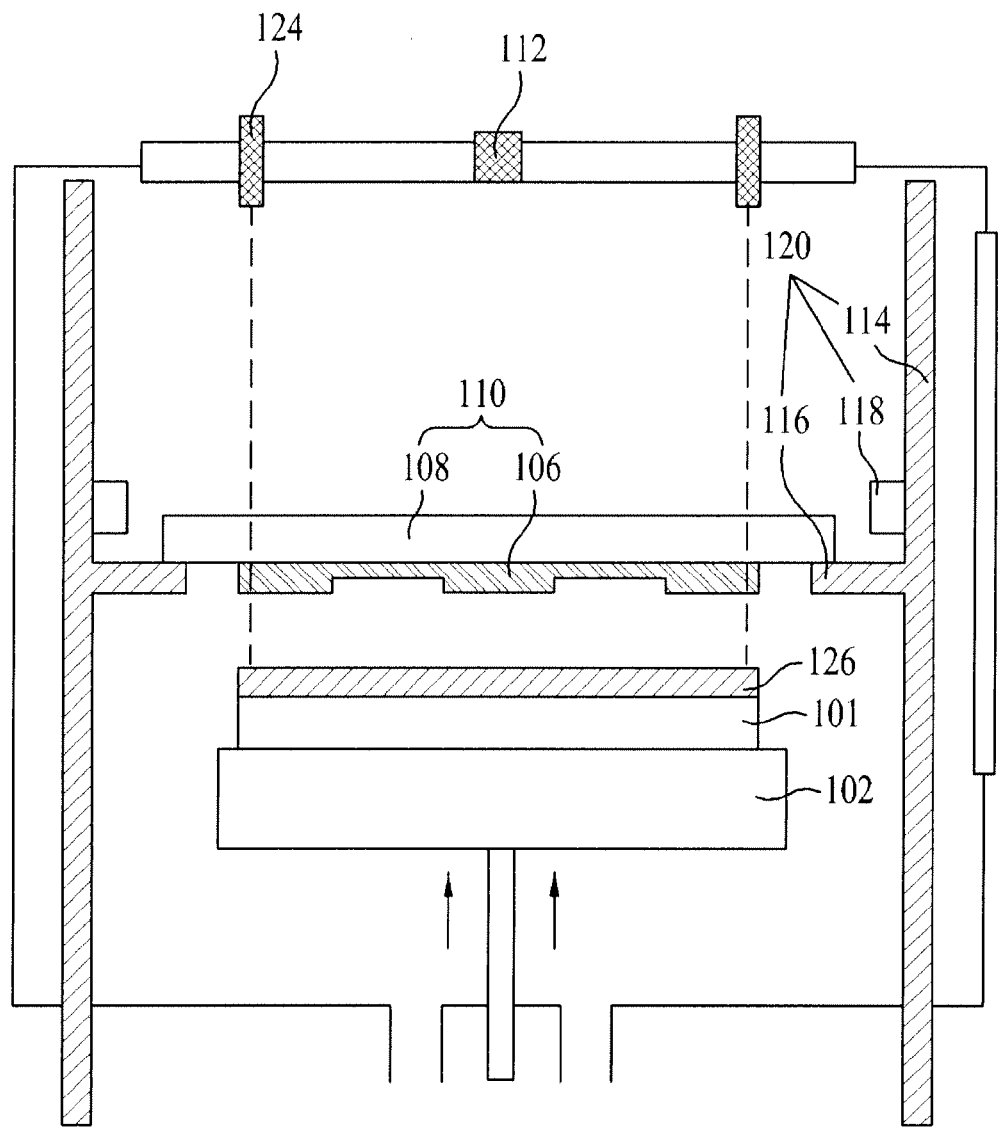
FIGS. 3A to 3C illustrate sections showing the steps of a method for fabricating a flat display device in accordance with a preferred embodiment of the present invention by using the device in FIG. 1.
Figure 3B:
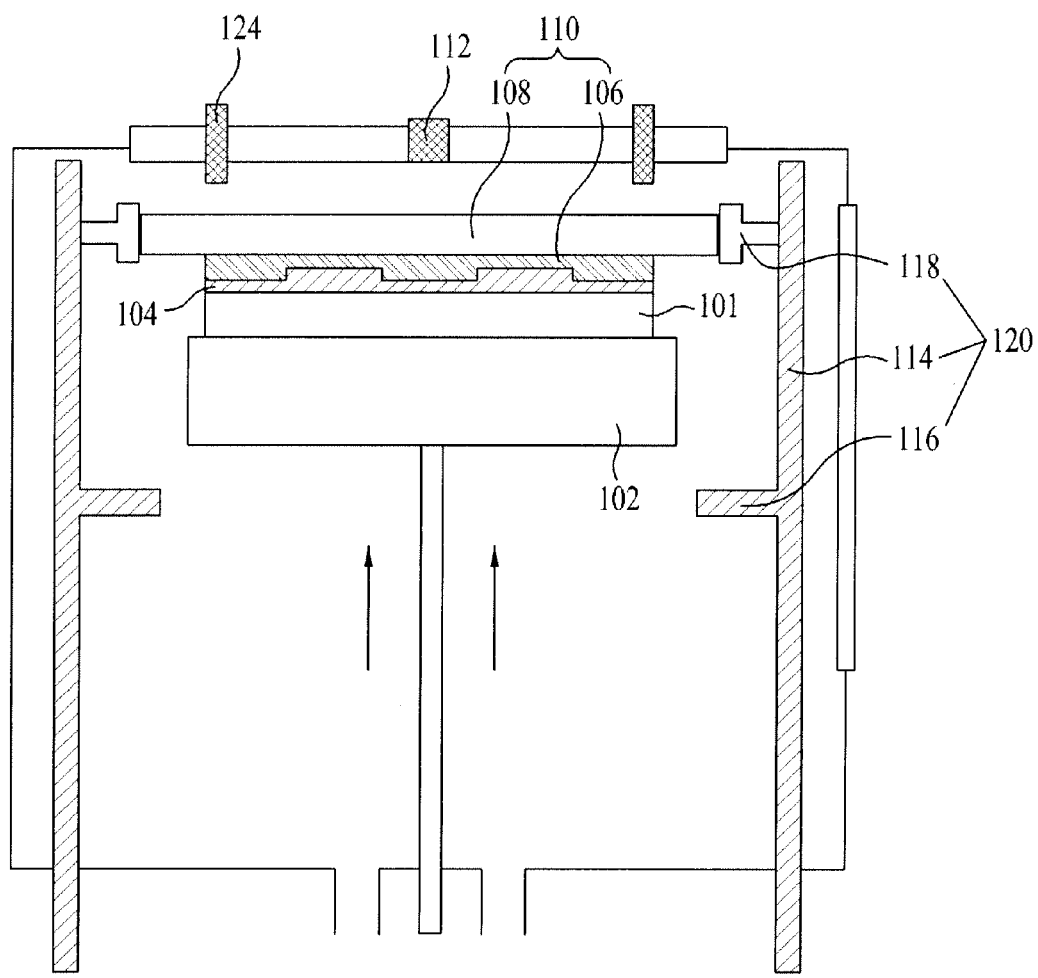
Figure 3C:
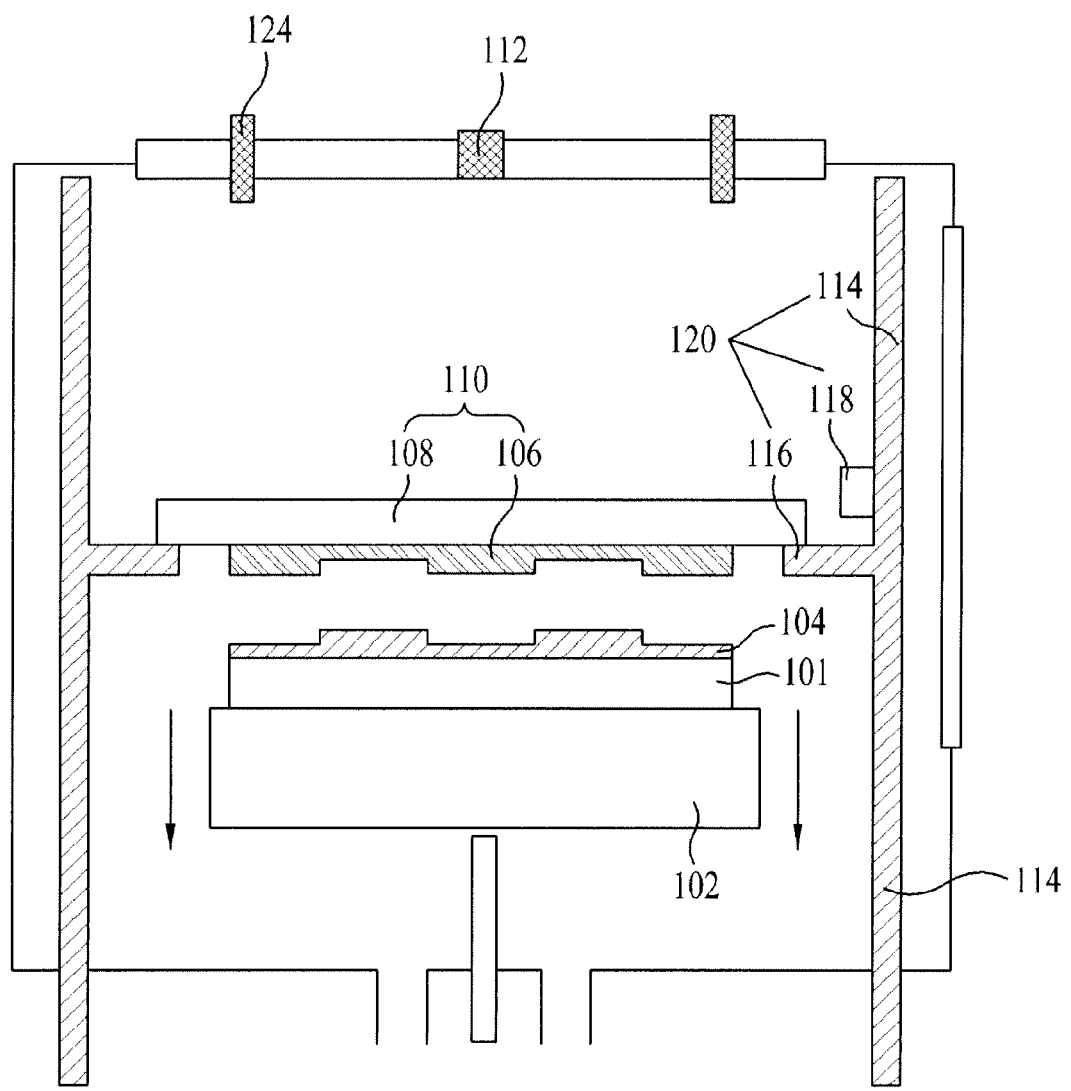

The imprinting mold 110 includes a back plane 108, and a mold unit 106 formed on the back plane 108. As shown in FIGS. 3A~3C, the back plane 108 has a size greater than the substrate 101. The mold unit 106 has a size similar to the substrate 101 and the grooves and the projections.

The light source unit 112 directs a UV or infrared beam to the imprinting mold 110 for curing the thin film pattern 104 on the substrate 101.

The vision unit 124 verifies and corrects a position deviation between the imprinting mold 110 and the substrate 101.

The imprinting mold supporting unit 120 includes a supporting frame 114, a mounting stage 116, and a mold holder 118.

The supporting frame 114 supports the mounting stage 116 and the mold holder 118.

The mounting stage 116 is formed to seat edges of the back surface of the back plane 108 of the imprinting mold 110 thereon. That is, the mounting stage 116 is come into contact with the back surface of the back plane 108 of the imprinting mold 110 which does not overlap with the substrate 101. According to this, the mounting stage 116 does not affect a travel path of the UV or infrared beam at the time of curing the liquid polymer precursor by using the light source unit 112.

Figure 2:
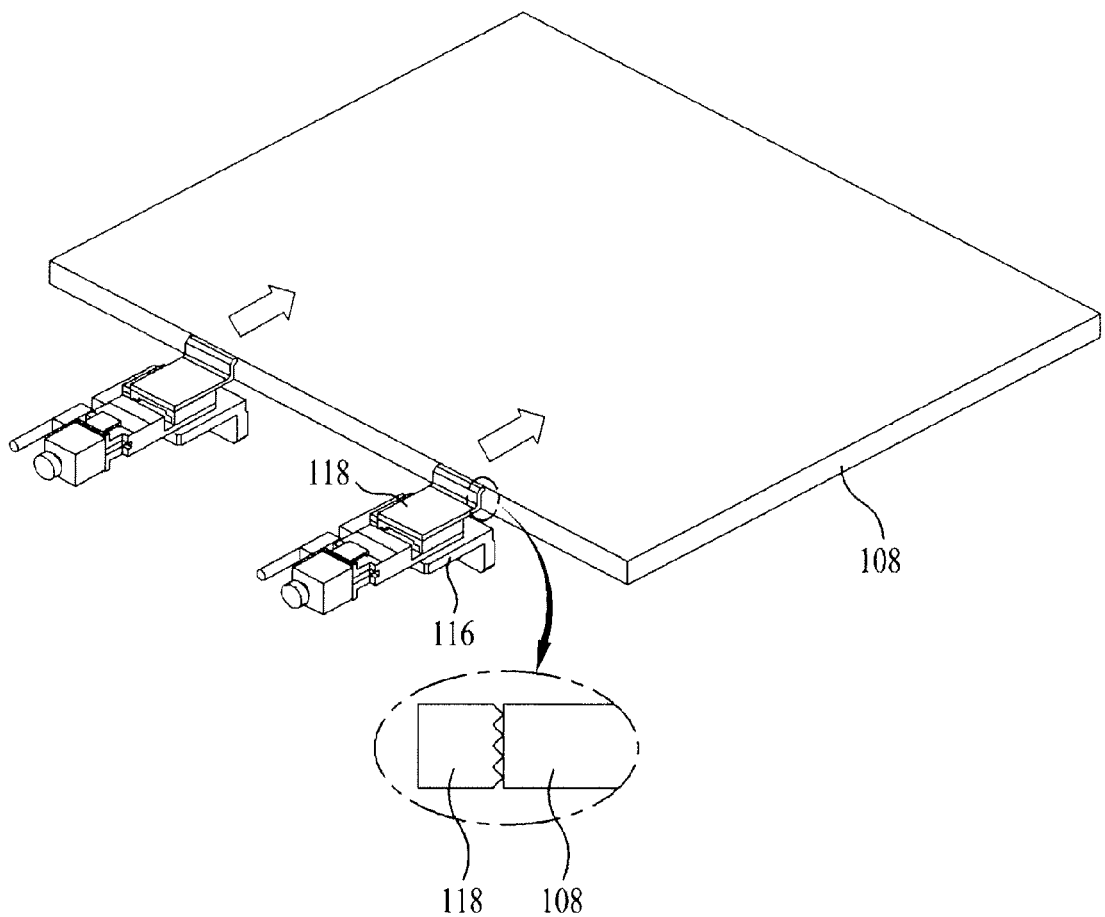
FIG. 2 illustrates a perspective view showing the mold holder in FIG. 1 in detail.

Referring to FIG. 2, the mold holder 118 holds sides of the imprinting mold 110. In detail, the mold holder 118 holds the imprinting mold 110 at the time the substrate 101 moves for alignment of the substrate 101 with the imprinting mold 110 after the substrate 101 and the imprinting mold 110 are bonded with each other. According to this, overlay can be improved by improvement of the alignment of the substrate 101 and the imprinting mold 110.

Moreover, the mold holder 118 is come into contact with the sides of the imprinting mold 110 such that the mold holder 118 does not come into contact with an upper surface of the imprinting mold 110 at the time the substrate 101 and the imprinting mold 110 are bonded with each other. Accordingly, since no gravity of the mold holder 118 is applied to the liquid polymer precursor on the substrate 101 at the time the substrate 101 and the imprinting mold 110 are bonded with each other, taking place of a defective pattern can be prevented.

The mold holder 118, formed of a soft material, such as Teflon in a wedge shape, prevents the imprinting mold 110 suffering from damage, and applies a uniform pressure to the sides of the imprinting mold 110.

FIGS. 3A~3C illustrate sections showing the steps of a method for a thin film pattern by using an imprinting device for fabricating a flat display device in accordance with a preferred embodiment of the present invention in FIG. 1.

A liquid polymer precursor 126 is spin or spinless coated on a substrate 101. The substrate 101 having the liquid polymer precursor 126 coated thereon is seated on a stage 102 as shown in FIG. 3A.

The stage 102 having the substrate 101 seated thereon is moved up to a maximum height at which the stage 102 does not come into contact with the imprinting mold 110. Then, the imprinting mold 110 and the substrate 101 are aligned by a vision unit 124 by aligning align keys (not shown) formed at the imprinting mold 110 and the substrate 101, respectively.

Referring to FIG. 3B, the stage 102 having the substrate 101 aligned with the imprinting mold 110 seated thereon moves up to a height higher than the mounting stage 116. If the stage 102 moves up to the height of the mounting stage 116, the imprinting mold 110 and the substrate 101 are bonded with each other. Then, the imprinting mold 110 at sides thereof is held by a pressure applied thereto from the mold holder 118. A positional deviation of the substrate 101 from the imprinting mold 110 is verified with the vision unit 124. If there is misalignment, a position of the substrate 101 is moved by the stage 102, to adjust the alignment.

Thus, once the imprinting mold 110 and the substrate 101 are aligned, as a solvent is absorbed from the liquid polymer precursor 126 to a surface of the imprinting mold 110, the liquid polymer precursor moves into grooves of the imprinting mold 110. As the liquid polymer precursor is cured by the light source unit 112, a thin film pattern 104 is formed. The thin film pattern 104 has a shape in which the grooves in the imprinting mold 110 in inverted and transcribed.

Then, referring to FIG. 3C, the stage 102 having the substrate 101 with the thin film pattern 104 formed thereon seated thereon is moved down. According to this, the imprinting mold 110 is held horizontally by the mounting stage 116, and the substrate 101 having the thin film pattern 104 formed thereon is separated from the imprinting mold 110.

Figure 4:
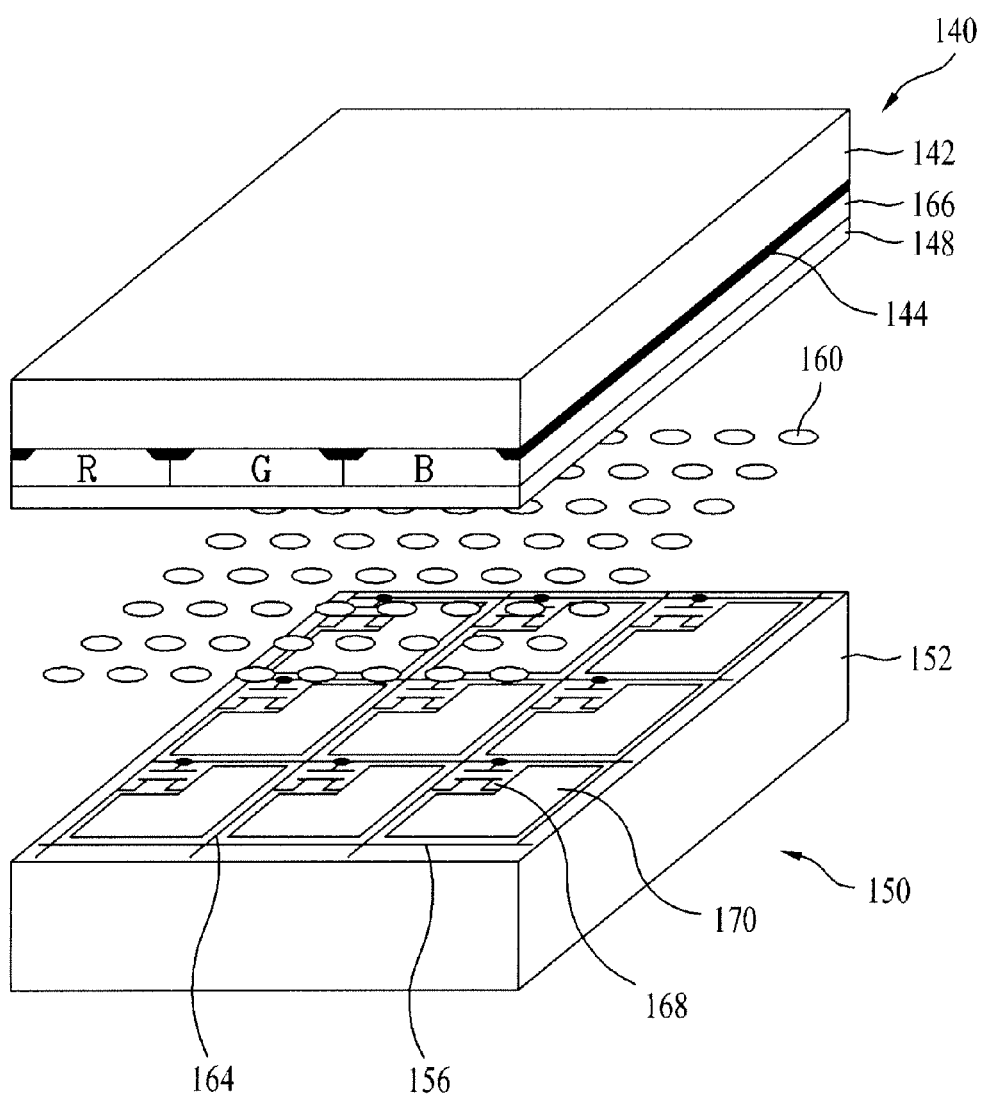
FIG. 4 illustrates a perspective view of a liquid crystal panel having a thin film pattern formed by the method in FIGS. 3A to 3C.

In the meantime, referring to FIG. 4, the thin film pattern 104 formed by using the imprinting mold 110 is applicable to a liquid crystal panel. In detail, referring to FIG. 4, the liquid crystal panel of the present invention includes a thin film transistor substrate 150 and a color filter substrate 140 bonded opposite to each other with a liquid crystal layer 160 disposed therebetween.

The color filter substrate 140 includes a black matrix 144 formed on an upper substrate 142 to prevent a light from leaking, a color filter 166 for producing a color, a common electrode 148 for forming an electric field with pixel electrodes, an over-coated layer for planarizing, column spacers formed on the over-coated layer for maintaining a cell gap, and an upper alignment film (not shown) to cover the column spacers and other components.

The thin film transistor substrate 150 includes gate lines 156 and data lines 164 formed to cross each other on a lower substrate 152, a thin film transistor 168 formed adjacent to every crossing portion thereof, a pixel electrode 170 formed at every pixel region formed by the crossed structure, and a lower alignment film (not shown) to cover above components.

The color filter 166, the black matrix 154, the column spacers, the thin film transistors 168, the gate lines 156, the data lines 164, or the pixel electrodes 170 of the liquid crystal panel can be formed by patterning by using the imprinting mold having grooves matched to a relevant pattern of above component.

As has been described, the device and method for fabricating a flat display device of the present invention have the following advantages.

The substrate is aligned with the imprinting mold in a state the imprinting mold is held by the mold holder after the imprinting mold and the substrate are bonded with each other. The alignment of the substrate with the imprinting mold after the imprinting mold and the substrate are bonded with each other permits to improve an over-lay accuracy and prevent the mechanical error like the related art from taking place.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for fabricating a flat display device comprising the steps of:

seating a substrate having a liquid polymer precursor on a stage;

holding horizontally an imprinting mold with a mounting stage to come into contact with a back surface of a back plane of the imprinting mold;

moving the imprinting mold and the stage having the substrate aligned with the imprinting mold seated thereon upward to a height higher than the mounting stage;

bonding the imprinting mold and the substrate with each other, for grooves and projections of the imprinting mold to press the liquid polymeric precursor, wherein the imprinting mold includes a back plane having a size greater than the substrate and a mold unit having the grooves and projections;

holding sides of the back plane with a mold holder when the substrate and the imprinting mold are bonded with each other; and separating the substrate from the imprinting mold.

2. The method as claimed in claim 1, wherein the substrate is moved by the stage to align the substrate with the imprinting mold when the substrate and the imprinting mold are bonded with each other.

3. The method as claimed in claim 1, wherein the mold holder has a wedge shaped surface for being brought into contact with the imprinting mold.

4. The method as claimed in claim 1, wherein the mold holder is formed of Teflon.

* * * * *